Patented Feb. 23, 1937

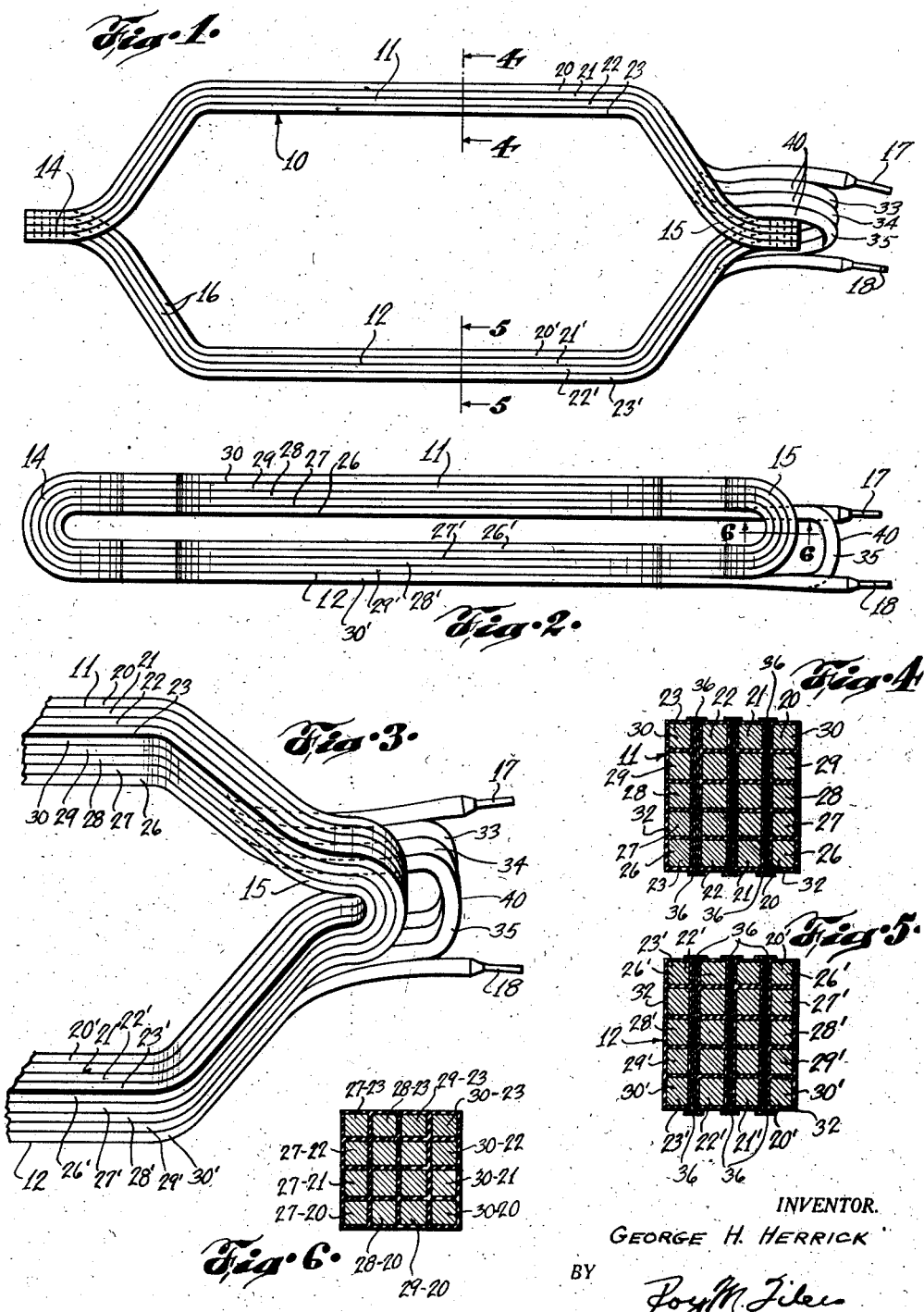

2,071,977

UNITED STATES PATENT OFFICE 2,071,977

COIL WINDING FOR DYNAMO-ELECTRIC MACHINES

George H. Herrick, Beloit, Wis., assignor to Fairbanks, Morse & Co., Chicago, Ill., a corporation of Illinois Application October 10, 1935, Serial No. 44,366

15 Claims. (Cl. 171—206)

This invention relates to coil windings for dynamo-electric machines, and more particularly to the structure of and manner of winding a greatly improved armature coil assembly for electrical machines of relatively high voltage type.

In the older prevailing types of armature coil windings for relatively high voltage machines, the manner of forming these windings has resulted in a number of disadvantageous features of coil construction and operation which, in many instances, have caused considerable trouble in the design, manufacture and operation of electrical machines in which these coils are assembled. For example, for large machines of high voltage type, the prevailing form of armature coil winding contains a number of coil turns generally connected in series relation. In the manufacture of these multiple turn coils, it is common practice to provide the series connections between the several turns at one end of the winding, with the connections, or crossovers as they are generally termed, disposed internally of the coil winding. Moreover, these multiple turn coils are generally wound in a manner resulting in a maximum voltage between turns, this voltage approximating the terminal voltage of the winding. Furthermore, the difference of potential and the potential stresses occurring at the series or crossover connections is normally very high, being in the neighborhood of one-third to two-thirds of the full terminal voltage of the coil. From the foregoing, it will be readily understood that, by reason of the substantially full terminal voltage existing between the several turns of the coil, and particularly the high voltage conditions heretofore prevalent at the series connections on one end of the coil, the several turns and series connections of these older windings are required to be highly insulated from each other. This is particularly true of the internal crossovers, in order to prevent short circuiting or breakdown in the coil winding. In the case of very high voltage machines, adequate insulation of the above noted coil parts is extremely hard to provide without effecting a bulky and heavy coil assembly. Hence, it is an object of the present invention to provide a greatly improved armature coil assembly which will, in large part, obviate the above noted difficulties, and which will result in a more compact and efficient coil winding.

Another object of the present invention is to be found in the provision of an improved armature coil winding designed particularly for assembly in relatively high voltage machines, the winding being so formed as to provide the series connections or crossovers externally of the winding, whereby these connections may be individually and more adequately insulated.

A further object is to be found in a greatly improved armature coil winding assembly in which the potential stresses are markedly reduced between turns and generally throughout the coil structure.

A still further object may be found in the provision of an armature coil which is designed particularly for assembly in electrical machines of high voltage type, the coil winding being of sturdy construction and compact in form.

Further objects and advantages will be found from the following description and from the drawing, in which:

Fig. 1 is a plan view of an assembled armature winding embodying the improvements of the present invention; Fig. 2 is a side elevation thereof; Fig. 3 is an enlarged, perspective view of one end portion of the armature winding; Fig. 4 is a transverse sectional elevation of one side or leg of the winding, as taken along line 4—4 in Fig. 1; Fig. 5 is a transverse section of the opposite leg of the winding, as viewed from line 5—5 in Fig. 1, and Fig. 6 is a transverse section of the winding as taken along line 6—6 in Fig. 2.

Referring now to the drawing by suitable characters of reference, the presently preferred form of armature coil winding embodying the improvements of the present invention is designated, generally, by the reference numeral 10. The winding is shown as comprised of parallel side or leg portions 11 and 12, and connecting coil end portions 14 and 15. The winding is, by preference, formed of a continuously wound conductor 16, beginning at the free end 17 and terminating at 18. As is presently preferred, the form of the conductor utilized in winding the coil 10 is of substantially square section as shown in Figs. 4 through 6. However, conductors of circular section or of any other sectional aspect may be used with substantially equal facility in winding the coil.

The structural arrangement of the conductor in the winding is best illustrated by Fig. 4, which shows a transverse section of the winding leg 11. The winding leg is comprised of parallel coil turn sections 20, 21, 22 and 23 and each coil section is further comprised of five conductor sections 26, 27, 28, 29 and 30. The several coil sections and the conductors in each section are fully insulated from each other, as by insulating material 32 completely enclosing each conductor. The opposite winding leg 12, a transverse section of which is shown in Fig. 5, has its coil sections arranged similarly to those of leg 11, as may be observed from an inspection of Figs. 1, 4 and 5, i. e., the section 20 of leg 11, which is the outside section of the leg when considering the winding as a whole, becomes in its extension to leg 12, the inside section 20' of this leg. The remaining sections in the legs 11 and 12 are similarly related. Referring particularly to Figs. 2 and 5, with regard to the relative position of the conductors in each coil section of leg 12, it will be observed that the conductors are arranged in reverse order, with respect to the arrangement of the conductors in the coil sections of winding leg 11. For example, the conductor 26 of coil sections 20 in leg 11 (see Fig. 4) which is the first or bottom outside conductor of this section, becomes, when extended to leg 12, the first or top inside conductor 26' of the inside coil section 20' in this leg. The next adjacent conductor 27 of the coil turn 20 in leg 11, when extended to coil section 20' of winding leg 12, becomes the conductor 27' next adjacent the conductor 26' in this leg, and so on, to the last conductors 30 and 30'. The conductors in each of the remaining coil sections follow in order in the same relation, in each of the winding legs. Thus where the conductors 26 through 30 of each of the coil sections of leg 11 follow in order from bottom to top as shown in Fig. 4, the similar or corresponding conductors 26' through 30' of each coil section in leg 12 follow in order from top to bottom as shown in Fig. 5.

The above described arrangement and relation of the coil turns or sections in the winding legs 11 and 12, and of the several conductor sections making up each of the turns, result from the particular manner in which the winding is formed. Referring particularly to Figs. 3, 4 and 5, the winding is begun from the terminal end 17 with the conductor 16 wound in closed loops, forming the winding leg portions 11 and 12 and the connecting ends 14 and 15. The conductor 16 extends from the terminal 17 to the winding leg 11, forming the leg conductor 26 of coil turn 20 (Fig. 4), thence about the coil end 14 to the winding leg 12, the conductor thus far extended forming in this leg the conductor section 26' of coil turn 20'. Conductor section 26' is then extended about the coil end 15 to leg 11 where it becomes the conductor section 27 of coil section 20 in this leg. The conductor is thus continued until the coil section 20 of leg 11 and the corresponding turn 20' of leg 12 is complete. From this point, the conductor is extended about the coil end 15 for continuing the winding of the coil to form the succeeding coil sections 21—21', 22—22', and 23—23'. The extension of the conductor about the coil end 15 from the completed turn 20—20' to the next succeeding turn 21—21' forms what may for convenience of description be termed a series connection, and in the present embodiment of this invention serves as a series or crossover connection 33 which is extended outwardly beyond the coil end 15 in the manner illustrated in Figs. 1 through 3. The conductor is then extended to the winding leg 11 where it becomes the conductor section 26 of coil section 21. Further extension of the conductor about the coil end 14 to the winding leg 12, provides the conductor section 26' of coil section 21' in this leg. From this point on, the turn 21—21' is wound exactly like turn 20—20' above described. The series connection or crossover 34 connects the turn 21—21' with turn 22—22', and similarly the crossover 35 connects turns 22—22' and 23—23'. The last conductor section 30' of coil turn 23' in leg 12, terminates in the free end 18 of the winding, as clearly appears in Fig. 3.

It will be noted from an inspection of Figs. 1 and 2, that the end portions 14 and 15 are disposed to lie in a plane which is at a substantial angle, which may approximate a right angle, to the plane of either of the winding legs 11 nd 12. This "twist" of the coil ends 14 and 15 results from the final shaping and forming of the coil after it is completely wound, and is in accordance with usual practice in shaping armature windings. Fig. 6 illustrates in section, the twisted portion of coil end 15, the section being taken along line 6—6 in Fig. 2, and looking toward the side 11 of the winding. In this view, the arrangement and relative positions of the several conductors in the winding end is clearly shown, each conductor being identified by the reference character denoting the particular coil section of leg 11 to which it belongs, and also by the reference character denoting the particular conductor in the winding section of which it forms a part. For example, the conductor section shown in the upper right hand corner of the coil end 15 illustrated in Fig. 6, is designated by the numerals 30—23 which indicate the particular conductor as being the conductor 30 of coil section 23. The remaining conductor sections are similarly designated, in accordance with their proper positions in the winding. It will be readily understood that by observing the section of Fig. 6 in the direction of the winding leg 12, the same arrangement of conductors exists, but as to their designation if viewed from that side of the winding, the several reference characters would appear as primed.

The above described arrangement of coil sections or turns and conductors effects a particularly desirable result, in that in the operation of the winding, the maximum voltage between turns is substantially reduced. Where, in the older prevailing forms of windings, the between-turn voltage is approximately equal to the full winding voltage, the present arrangement effects a marked reduction in the between-turn voltage, the reduction being approximately one-third of the former values.

In a coil constructed according to the present improvements, it will appear from an analysis of the drawing that any given conductor, if traced through the several turns constituting the completed coil, always remains adjacent the conductors of the turn of which it initially formed a part. This is not true in the case of high voltage coils wound according to older practice of winding the conductor so that it becomes, successively, the first element of the first turn, the first of the second turn, and so through the coil according to the number of turns of conductor employed, thence the second element of the first turn, the second of the second turn, etc. It will appear that this older prevailing practice will result in a substantial E. M. F. between the conductors of any given turn, whereas according to the described method of winding each turn to completion, then appropriately connecting the turns, the voltage between conductors of a given turn is minimized. A further distinct advantage exists in that, with the improved method of disposing, and the resulting arrangement of conductors, the polarity of the different conductors of a given turn is always constant, in contrast to the condition within turns of the older types of coil. It will be obvious that the presently described method of building the coil lends itself to a practical and economical use of sheet insulation such as 36 between turns, and also minimizes the requirement of insulation between the conductors within and constituting any given individual turn.

Moreover, in the general form of armature winding to which the invention is applicable, the greatest potential stresses occur in the series or crossover connections 33, 34 and 35, wherefore these connections should be well insulated. As these connections according to present improvements are extended in a free manner outwardly beyond the coil end 15, the separate insulation of each connection may be readily and easily effected so as adequately to protect this portion of the winding. The insulation 40 provided for the series crossovers 33, 34 and 35 is therefore more extensive than the insulation 32 about the leg conductors, as will be readily apparent from an inspection of the completely formed and assembled armature winding shown in Figs. 1 and 2, since when fully insulated, they are of greater overall diameter. Furthermore, since these connections are formed externally of the winding end portion 15, they may be inspected at any time without removing the winding from the machine in which it is assembled.

It is to be understood that the present invention is not limited to the particular embodiment hereinabove described, but that substantial alterations or modifications may be made therein without departing from the spirit and full intended scope of the invention, as defined by the appended claims.

I claim:

1. A coil winding for an electrical machine, comprising a body consisting of a plurality of complete, individual coil turns and series connections between said turns, said connections being extended outwardly beyond the body of the winding, whereby each thereof may be separately insulated.

2. A coil winding for an electrical machine, comprising a body consisting of a plurality of unitary insulated coil turns and series connections between said turns, said series connections being extended beyond the body of the winding, whereby each thereof may be separately insulated, apart from the insulation of the coil turns.

3. An armature coil for a high voltage electric machine, characterized by distinct legs of opposite polarity, a plurality of turns, a plurality of conductors in each of said turns, the conductor elements being continuous within each of said turns to complete each turn as an individual unit, a connection exteriorly of the coil proper, between adjacent turns, and a free end of the conductor extending from each of the legs of the coil, and constituting a terminal connection.

4. An armature coil for a high voltage electric machine, the coil being characterized by legs of opposite polarity, and end connections between said legs, the coil consisting of a plurality of turns each comprising a plurality of conductors, the conductors being arranged in the coil so as to form each of said turns as a complete unitary structure, and further arranged to provide series connections exteriorly of the coil proper, between the said turns, said series connections being all located at one end of the coil, and a free end of the conductor being extended from each of the legs of the coil, at the said end thereof, and constituting a terminal connection.

5. An armature coil for a high voltage electric machine, the coil being characterized by substantially parallel leg portions of opposite polarity, and loop portions at the ends of the legs, the coil consisting of at least three distinct turns each comprising a plurality of conductor elements so arranged that each turn is structurally and electrically complete as a unit, series connections between the turns of the coil, extending exteriorly of the said loop portions and individually insulated, a free end of the conductor extending from one of said legs and a second free end of the conductor extending from the other of said legs, the said free ends constituting terminal connections for the coil.

6. The described method of winding a high voltage coil of a type characterized by distinct legs of opposite polarity, and a plurality of turns each comprising a plurality of conductors, which consists in winding a length of conductor so as to produce therefrom all of the conductor elements of a given turn of the coil, thence winding the conductor to produce the conductor elements of the remaining successive turns, in extending beyond the body of the coil an end of the conductor from each of the said turns of the coil, and utilizing said extensions for connecting the adjacently wound turns of the coil, in individually insulating each of said connections between the adjacently wound turns, and in extending a free end of the conductor from each of the legs of the coil, for terminal connection.

7. The described method of winding a high voltage coil of a type characterized by distinct legs of opposite polarity, and a plurality of turns each comprising a plurality of conductors collectively shaped into a formed coil unit or body, which consists in winding a length of conductor so as to produce therefrom all of the conductor elements of a given turn of the coil, thence winding the conductor to produce the conductor elements of an adjacent turn, in extending beyond the formed body of the coil an end of the conductor from each of the said turns of the coil, and utilizing said extensions for connecting exteriorly of the formed coil body, the adjacently wound turns of the coil, and in extending a free end of the conductor from each of the legs of the coil, for purposes of terminal connection.

8. The described method of winding a high voltage coil of a type characterized by distinct legs of opposite polarity, and a plurality of turns each comprising a plurality of conductors, which consists in winding a length of conductor so as to produce therefrom all of the conductor elements of a given turn of the coil, thence winding the conductor to produce the conductor elements of an adjacent turn, in providing a connection between said turns, exteriorly of one end of the coil, and in extending a free end of the conductor from each of the legs of the coil, and at the said end thereof, for purposes of terminal connection.

9. The described method of winding a high voltage armature coil of a type characterized by distinct legs of opposite polarity, and formed of at least three distinct turns each comprising a plurality of conductors, which consists in winding a length of conductor so as to produce therefrom all of the conductor elements of a given turn of the coil, thence winding the conductor to produce the conductor elements of the remaining successive turns, in extending the conductor from the first said turn to form a connection to the second turn, and from the second turn, for connection to the third turn, beyond the body of the coil, and in extending a free end of the conductor from the first said turn, and another free end of the conductor from the last turn of the coil, for purposes of terminal connection.

10. A coil winding for an electrical machine, comprising a plurality of insulated coil turns and series connections electrically associating the several coil turns, said connections being disposed outwardly of one end of the winding, whereby to permit special individual insulation thereof, separate from the insulation of said coil turns.

11. A coil winding for an electrical machine, comprising a plurality of insulated coil turns, the winding being formed to provide parallel side portions and connecting end portions, and series connections electrically associating the several coil turns, said connections being accessibly disposed outwardly of one of said connecting end portions, and the connections being individually insulated apart from and exteriorly of the coil turns.

12. A coil winding for an electrical machine, comprising a plurality of insulated coil turns, terminals for said winding and series connections electrically associating said coil turns, said connections and terminals being disposed on one end of the winding, with the connections extended outwardly of said winding end, said connections being individually insulated in a manner differing from the normal insulation of the remaining portions of the winding.

13. A coil winding for an electrical machine, comprising an assembly of insulated coil turns, terminals for said winding, and series connections electrically associating the coil turns, said terminals and connections being disposed externally of the coil turn assembly, adjacent one end thereof, each of said connections being insulated in a manner distinct from the insulation of the conductors within the assembly.

14. A coil winding for a high voltage electrical machine, comprising an assembly of insulated individually complete coil turns formed to provide parallel side portions and connecting end portions, terminals for said coil assembly, and series connections electrically associating the coil turns of said assembly, said connections being disposed externally of one of said connecting end portions of the assembly and adjacent said terminals, said connections further being separately, extensively insulated.

15. A coil winding for an electrical machine, the winding being a multi-turn, series wound type, wherein each of the winding turns is comprised of a plurality of conductors, the winding further being formed to provide parallel side portions and connecting end portions, terminals for the winding, and series connections between said turns, the terminals and series connections being disposed near one of said connecting end portions, with the series connections extended beyond said end, whereby the said connections are accessibly located and may be separately and extensively insulated.

GEORGE H. HERRICK.